(12) United States Patent
Bergstra et al.

(10) Patent No.: US 8,354,483 B2
(45) Date of Patent: Jan. 15, 2013

(54) REACTOR SYSTEM AND PROCESS FOR THE CATALYTIC POLYMERIZATION OF OLEFINS, AND THE USE OF SUCH REACTOR SYSTEM IN CATALYTIC POLYMERIZATION OF OLEFINS

(75) Inventors: Michiel Bergstra, Helsinki (FI); Erik Eriksson, Helsinki (FI); Gunter Weickert, Ahaus (DE)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 12/809,821

(22) PCT Filed: Dec. 23, 2008

(86) PCT No.: PCT/EP2008/011083
§ 371 (c)(1),
(2), (4) Date: Jun. 21, 2010

(87) PCT Pub. No.: WO2009/080360
PCT Pub. Date: Jul. 2, 2009

(65) Prior Publication Data
US 2010/0267915 A1    Oct. 21, 2010

(30) Foreign Application Priority Data
Dec. 24, 2007    (EP) .................................... 07076126

(51) Int. Cl.
*C08F 2/34* (2006.01)
*B01J 8/24* (2006.01)
*C08F 10/02* (2006.01)

(52) U.S. Cl. ........... 526/65; 526/918; 422/135; 422/141
(58) Field of Classification Search .................... 526/65, 526/918, 64; 422/132, 135, 141, 142; 525/53
See application file for complete search history.

(56) References Cited

U.S. PATENT DOCUMENTS

| 4,203,228 A | 5/1980 | Aradi et al. |
| 4,532,311 A | 7/1985 | Fulks et al. |
| 4,543,399 A | 9/1985 | Jenkins, III et al. |
| 4,552,203 A | 11/1985 | Chrysostome et al. |
| 4,578,879 A | 4/1986 | Yokoyama et al. |
| 4,621,952 A | 11/1986 | Aronson |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |

(Continued)

FOREIGN PATENT DOCUMENTS

EP    0188125 A2    7/1986

(Continued)

*Primary Examiner* — Fred M Teskin
(74) *Attorney, Agent, or Firm* — The Webb Law Firm

(57) ABSTRACT

The invention relates to a reactor system and process for the catalytic polymerization of olefin monomer and optionally comonomer(s), having one or more inlets for olefin monomer, catalyst, optionally for comonomer, chain growth controllers or chain transfer agents, and/or inert gas, an outlet for gas and an outlet for polymerized particles. The reactor system has at least one fluidized bed unit and at least one moving bed unit, wherein the fluidized bed unit has means for maintaining a fluidized bed in the fluidized bed unit and wherein the moving bed unit is provided with an inlet and an outlet which are connected to the fluidized bed unit, wherein the outlet of the moving bed unit is provided with means for displacing metered quantities of polymerized particles from the moving bed unit into the fluidized bed unit, and to the use of such reactor system.

19 Claims, 4 Drawing Sheets

U.S. PATENT DOCUMENTS 7,776,973 B2 8/2010 Weickert
7,781,545 B2 8/2010 Weickert et al.

FOREIGN PATENT DOCUMENTS

| | | |
|---|---|---|
| EP | 0250169 A2 | 12/1987 |
| EP | 0499759 A1 | 8/1992 |
| EP | 0517868 B1 | 12/1992 |
| EP | 0560035 A1 | 9/1993 |
| EP | 0579426 A1 | 1/1994 |
| EP | 0600414 A1 | 6/1994 |
| EP | 0684871 B1 | 12/1995 |
| EP | 0696293 B1 | 2/1996 |
| EP | 0699213 B1 | 3/1996 |
| EP | 0707513 B1 | 4/1996 |
| EP | 0721798 A2 | 7/1996 |
| EP | 1415999 A1 | 5/2004 |
| EP | 1484343 A1 | 12/2004 |
| EP | 1550502 A1 | 7/2005 |
| WO | 9425495 A1 | 11/1994 |
| WO | 0026258 A1 | 5/2000 |
| WO | 0029452 A1 | 5/2000 |
| WO | 0105845 A1 | 1/2001 |
| WO | 2004111095 A1 | 12/2004 |
| WO | 2005087361 A1 | 9/2005 |
| WO | 2007025640 A1 | 3/2007 |

REACTOR SYSTEM AND PROCESS FOR THE CATALYTIC POLYMERIZATION OF OLEFINS, AND THE USE OF SUCH REACTOR SYSTEM IN CATALYTIC POLYMERIZATION OF OLEFINS

BACKGROUND OF THE INVENTION

1) Field of the Invention

The present invention relates to a reactor system and to a process for the catalytic polymerization of olefins, and to the use of such reactor system for catalytic polymerization of olefins.

2) Description of Related Art

The catalytic polymerization of olefins uses among others a catalyst of the Ziegler-Natta type. New generations of catalyst for olefin polymerization including single site catalysts have been developed in view of a more regular polymer structure. During the catalytic polymerization the olefin composition is substantially constant around the particle.

Polyolefins produced using a recent generation of Ziegler-Natta catalysts have a relative narrow molecular weight distribution. The breadth of the molecular weight distribution influences the rheology behaviour and the final mechanical properties of the produced polyolefins.

In order to obtain a broader multimodal molecular weight distribution, use is made of different reactor conditions, such as different concentrations for monomer, comonomer and/or hydrogen. Another option is the use of specific and/or combined catalysts.

Traditionally, cascaded reactors are used for applying different reaction conditions during the catalytic polymerization in order to obtain a broad or multimodal molecular weight distribution.

One such type of reactor is a fluidized bed gas phase reactor. In a fluidized bed gas phase reactor olefins are polymerized in the presence of a polymerization catalyst in an upwards moving gas stream. The reactor is typically a vertical cylindrical vessel containing the fluidized bed. The bed comprises growing polymer particles containing active catalyst dispersed therein. The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP 684871. Reactor gasses exiting the reactor are compressed and recycled. Make-up monomers and optionally hydrogen are added as needed. Entrained particles can be separated by an interposed cyclone and recycled to the polymerization reactor.

Traditionally from the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO 2005/087361. Other types of fluidization grids are disclosed, among others, in U.S. Pat. No. 4,578,879, EP 600414 and EP 721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher than minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are known by using common engineering practise. An overview is given, among others, in Geldart: Gas Fluidization Technology, J. Wiley & Sons, 1986.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor, compressed and cooled in a heat exchanger to remove the heat of reaction. The gas is cooled to a temperature which is lower than that of the bed to prevent the bed from over-heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO 2007/025640, U.S. Pat. No. 4,543,399, EP 699213 and WO 94/25495. It is also possible to add condensing agents into the recycle gas stream, as disclosed in EP 696293. The condensing agents are non-polymerisable components, such as propane, n-pentane, isopentane, n-butane or isobutane, which are at least partially condensed in the cooler.

Prior to the entry into the reactor fresh reactants are introduced into the fluidization gas stream to compensate for the losses caused by the reaction and product withdrawal. It is generally known to analyse the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO01/05845 and EP 499759 disclose such methods. Where the gas phase reactor is a part of a reactor cascade the catalyst is usually dispersed within the polymer particles from the preceding polymerization stage. The polymer particles may be introduced into the gas phase reactor as disclosed in EP 1415999 and WO 00/26258.

The polymeric product may be withdrawn from the gas phase reactor either continuously or intermittently. Combinations of these methods may also be used. Continuous withdrawal is disclosed, among others, in WO 00/29452. Intermittent withdrawal is disclosed, among others, in U.S. Pat. No. 4,621,952, EP 188125, EP 250169 and EP 579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP 560035. They are usually polar compounds and include, among others, water, ketones and alcohols.

The reactor may also include a mechanical agitator to further facilitate mixing within the fluidized bed. An example of suitable agitator design is given in EP 707513.

Another type of such reactors is a moving bed reactor.

In the moving bed the catalytic polymerization conditions are different compared to those in the fluidized bed. First, the bed density is higher in the moving bed unit. Furthermore, in order to apply different polymerization conditions use is made of a separation fluidum in order to create different catalytic polymerization conditions. For example, a polymerization may be carried out at a lower concentration of a chain growth terminating agent such as hydrogen. Applying a separating fluidum to the moving bed unit results in a separation in reaction conditions between the fluidized bed unit and the moving bed unit. Preferably the separation fluidum is added inside the moving bed, preferably to a level of from 0.1 to 0.7 of the total bed level of the moving bed above the base of the moving bed, and forms a cushion on the moving bed through which cushion of separating fluidum the particulate polymeric material settles on the forming moving bed. The separation fluidum may be a gas or a liquid or a mixture of a gas and a liquid. The separation fluidum may be inert to the catalytic polymerization such as nitrogen and $C_1$-$C_{12}$-alkane.

The separation fluidum may be reactive such as monomer, comonomer such as $C_2$-$C_{12}$-alkylene or mixtures thereof. Mixtures of inert and catalytic polymerization reactive separation fluidum may be used as desired.

Preferably, use is made of a separation fluidum which is a liquid which evaporates under the conditions residing during the catalytic polymerization in the moving bed. Accordingly, during evaporation a gas cushion of separating fluidum is formed and at the same time a cooling of the exothermic polymerization reaction occurs with at the same time a much higher reactant concentration when using reactive separation fluidum.

The addition of separation fluidum but also the reactant to both fluidized bed unit and moving bed unit may be such that in the fluidized bed unit and/or in the moving bed unit a condensed mode polymerization occurs which is beneficial to productivity.

It is further preferred when the separation fluidum comprises a polymerization monomer or comonomer or mixture thereof.

WO2004/111095 discloses a reactor system and a process for the catalytic polymerization of olefins. The reactor system comprises a fluidized bed unit and a moving bed unit which are integrated such that the residence time in the fluidized bed unit and the residence time in the moving bed unit could be independently controlled. The outlet of the moving bed unit connected to the fluidized bed unit could be provided with means for controlling the outflow rate of polymer particles from the moving bed unit into the fluidized bed unit.

The means for controlling the outflow of polymer particles are not further described in WO2004/111095.

SUMMARY OF THE INVENTION

The present invention has for its object to provide means having a good control of the outflow rate of polymer particles from the moving bed unit into the fluidized bed unit while the inflow of fluidization gas from the fluidized bed unit into the moving bed unit via the outlet of the moving bed unit is substantially avoided. This is true because the low gas velocity and the high reaction rate will increase the risk of a reactor interruption or plugging. Still there will be substantially no interference with the optimal functioning of the moving bed unit and of the fluidized bed unit.

Accordingly the present invention provides the reactor system for the catalytic polymerization of olefin monomer and optionally comonomer(s), comprising one or more inlets for olefin monomer, catalyst, optionally for comonomer, chain growth controllers or chain transfer agents, and/or inert gas, an outlet for gas and an outlet for polymerized particles, which reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are connected to the fluidized bed unit, wherein the outlet of the moving bed unit is provided with means for displacing metered quantities of polymerized particles from the moving bed unit into the fluidized bed unit.

Due to the metered displacement of quantities of polymer particles, the outflow rate of polymer particles from the moving bed unit into the fluidized bed unit is optimally controlled. The metering of quantities of polymer particles is obtained by using mechanical means displacing actively metered volumes and therefore metered quantities of polymer particles from the moving bed unit into the fluidized bed unit. Accordingly precise amounts of polymer particles may be removed out of the moving bed unit. Therefore, it is possible to precisely control the residence time of the polymer particles in the moving bed unit and thus the properties of the polymer material formed.

Various different embodiments of these mechanical displacement means could be used for metering and removing defined quantities of polymer particles from the unit bed unit into the fluidized bed unit. The outlet of the moving bed unit is therefore provided with these displacement means according to the invention. The displacement means could reside in the outlet of the moving bed unit or could be upstream and/or downstream of the moving bed outlet. Under all circumstances the displacement means are arranged such that polymer particles are only displaced out of the moving bed unit into the fluidized bed unit via the displacement means metering specific desired quantities of polymer particles.

According to a first embodiment the displacing means comprise a screw connected to the outlet of the moving bed unit. Such a screw defines within its screw flange or flight a particular volume. This volume by rotation of the screw is transported forwards. Accordingly the rotational speed of the screw determines precisely the metered displacement of quantities of polymer particles. By controlling the rotational speed of the screw the residence time within the moving bed unit could be adjusted as desired.

According to another embodiment the displacing means comprise a rotary feeder, such as a scooper, connected to the outlet of the moving bed unit. A scooper is a metering device which comprises a series of circumferentially spaced apart scoops which rotate within a housing provided with an inlet and an outlet. Accordingly, a volume defined by the space in-between two scoops and the neighbouring housing confinement determine the amount of polymer particle displaced and removed from the moving bed reactor. Again, by controlling the rotational speed of the scooper the outflow rate could be carefully determined, for instance in relation to the required residence time within the moving bed.

According to another embodiment the displacing means comprise piston means connected to the outlet of the moving bed unit. The piston means may comprise a piston which is reciprocally slideable within a piston housing. According to another option the piston means could be rotational piston means rotating within a piston housing. Again by controlling the slideable movement and or the rotational movement of the piston the outflow rate of polymer particles could be carefully controlled.

The polymer particles displaced by the displacement means will enter the fluidized bed unit. In order to avoid any interference with the residing fluidization gas flow in the fluidized bed unit, it is preferred that the outlet of the displacement means is oriented in an inclined, or a horizontal direction. Accordingly it is avoided that the outlet of the displacement means is oriented against the direction of the fluidization gas thereby due to pressure built up may result in an interference with the effectively displaced metered amount of polymer particles. It is preferred that the displacement means exit the metered amount of polymer particles in a direction which is to a large extent parallel to the residing fluidization gas direction.

When the displacement means are activated by a rotational shaft, it is preferred that this rotational shaft is oriented in a substantially vertical position. This allows the possibility of connection to stirrer means present in the fluidized bed unit or present in the moving bed unit. Under such circumstances it is possible to use the same driving means for both driving the stirrer means and the rotational shaft of the displacement means. By insertion of gear means it is possible to change the rotational speed of the rotational shaft of the displacement means independent from the rotational speed for the stirrer in the fluidized bed unit and/or moving bed unit. By means of a gear it is also possible to change the direction of the powder flow, if necessary. Accordingly, it is possible to provide for the displacement means according to the invention at a simple construction and hardly any interference with the internal layout of the fluidized bed unit or moving bed unit.

The stirrer means could be provided with gas feed means in order to feed gas at one or more levels over the length of the moving bed unit. Accordingly it is possible to improve the gas feed and gas distribution within the moving bed unit. Overheating is substantially avoided, whereas different gas concentrations over the length of the moving bed unit could be applied in view of desired properties of polymer particles. In addition, at larger reactors, with larger moving bed units having a larger length, the presence of concentration gradients will not give rise to reactor problems. Finally, it is to be born in mind that by using moving bed units gas feed homogeneously steering of the content of the moving bed unit over horizontal layers is also improved.

A very simple construction of the reactor system is provided for when the gas feed means are incorporated in the displacement means according to the present invention. Accordingly via the displacement means, such as via the rotational shaft of the displacement means, gas feed could enter the moving bed unit via the stirrer (arms) gas could reach any horizontal and vertical level within the moving bed unit.

Finally it is noted that in relation to the reactor system the moving bed unit could reside within the fluidized bed unit. According to another embodiment the moving bed unit is arranged outside the fluidized bed unit.

Obviously, two or more moving bed units could be used in combination with one or more fluidized bed units.

According to a further embodiment the moving bed unit could be situated adjacent to the fluidized bed unit and connected to the fluidized bed unit via an inlet to the moving bed unit and via an outlet of the moving bed unit.

According to another aspect of the present invention, is provided a process for the catalytic polymerization of olefins, wherein olefins are polymerized with a particulate catalyst, and optionally comonomer, chain growth controllers or chain transfer agents, and/or inert gas, wherein at least part of the polymerization reaction is carried out in a reactor system comprises at least one fluidized bed unit and at least one a moving bed unit, wherein the fluidized bed unit comprises means for maintaining a fluidized bed in the fluidized bed unit and wherein the moving bed unit is provided with an inlet and an outlet which connected to the fluidized bed unit, wherein the outlet of the moving bed unit is provided with means for displacing metered quantities of polymerized particles from the moving bed unit into the moving bed unit.

Obviously the various embodiments mentioned above in relation to reactor system may be as such used within this process.

Following a preferred option separation fluidum is supplied to the moving bed, such as via the displacement means and stirrer means. Preferably the fluidum is added directly to the moving bed at a level of about from 0.1 to 0.7 of the height of the bed above the base. The separation fluidum is a gas or a liquid and selected from the group comprising an inert gas or liquid, such as nitrogen, $C_1$-$C_{12}$-alkane or olefins such as $C_2$-$C_{12}$-alkylene, or mixtures thereof, and preferably the separation fluidum is a liquid evaporating under the residing polymerization conditions. Accordingly this separation fluid provides an optimum separation "cushion" in-between the inlet of the moving bed unit and the adjacent fluidized bed unit.

If in a preferred embodiment the polymerization in a moving bed unit is to be carried out in a so called condensed mode, then it is preferred to add liquid olefins as a separation fluidum. In addition, or as an alternative it is also possible that liquid olefins are added to the fluidized bed such that the polymerization in the fluidized bed is in a condensed mode polymerization.

Finally, another aspect of the present invention relates to the use of a reactor system according to the invention for catalytic polymerization of olefins.

BRIEF DESCRIPTION OF THE DRAWINGS

Mentioned and other features of the reactor system, process and use according to the invention will be further illustrated by reference to the annexed figures relating to embodiments which are only given for illustrated purposes without providing any limitation to the present invention.

DETAILED DESCRIPTION OF THE INVENTION

Figure 1:
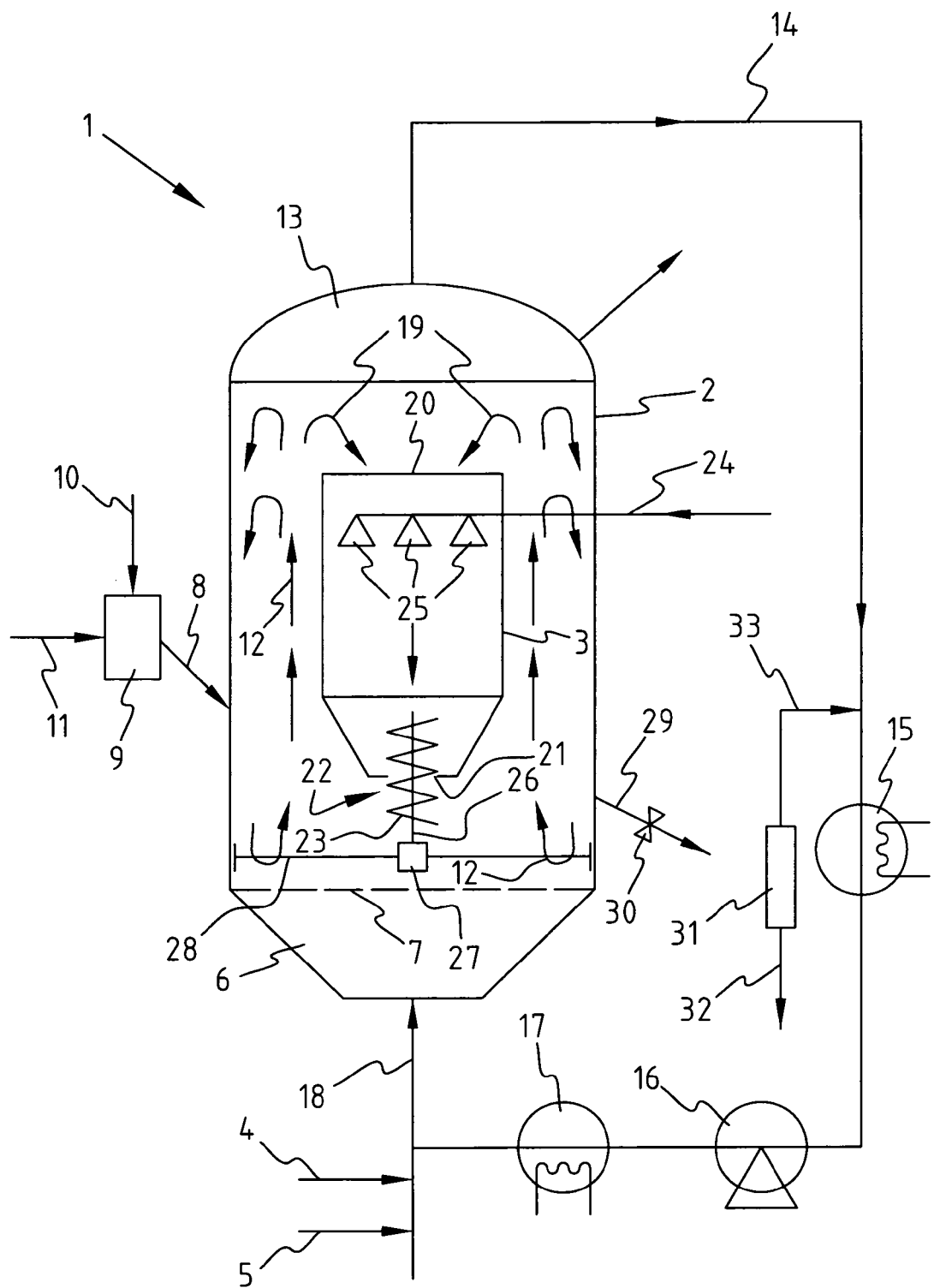
FIG. 1 shows a reactor system having as displacement means a screw arranged in the outlet of the moving bed unit residing within the fluidized bed unit.

FIG. 1 shows a reactor system 1 according to the invention for the catalytic polymerization of olefins. Olefins used in the process according to the invention comprise $C_2$-$C_{12}$ olefins, preferably $C_2$-$C_8$-olefins such as ethylene, propylene, butene-1, pentene-1, hexene-1, 4-methylpentene-1 and octene-1. These olefins may also be used for the production of homopolymers. Copolymers may be produced by using for instance ethylene and/or propylene in combination with other $C_2$-$C_8$ alpha-olefins. Polyenes may be used for copolymerization, such as dienes, for instance 1,3-butadiene, 1,5-hexadiene, dicyclopentadiene, ethylidene norbornene and vinyl norbornene.

In the catalytic polymerization Ziegler-Natta-catalysts are used which are conventional catalysts available in the art. The catalyst could be selected as desired in view of the ultimate polymer properties.

This reactor system 1 may be a part of a multi-stage process for producing polyolefins, in particular multimodal polyolefins and polyolefins with a broad molecular weight distribution. In this multi-stage process the first reactor is generally a liquid phase reactor as is for example described in EP-A-0 517 868. This first reactor is generally a loop reactor wherein olefins are polymerized in an inert hydrocarbon medium. Preferably, this inert hydrocarbon medium is a low boiling hydrocarbon which could be selected from the group comprising propane, butane, isobutane, pentane, hexane, heptane, octane, cyclohexane and cycloheptane or other inert media. Obviously mixtures of those hydrocarbons could be used as well.

In the first reactor the polymerization is preferably carried out at a temperature of about 60° C. to 110° C. at a pressure of 40-90 bar.

This polymerization in the first reactor can be carried out under supercritical conditions, wherein the polymerization temperature and pressure are above the corresponding critical points of the mixture formed by the olefins, hydrogen, and fluidum of the inert low boiling hydrocarbon. The temperature and pressure in this third reactor are preferably about 85° C.-110° C. and 50-90 bar, respectively. By using supercritical conditions it is possible to use higher hydrogen and ethylene concentrations as would be possible under sub-critical conditions.

The reaction mixture is removed from the first reactor either continuously or intermittently. Preferably, hydrogen, non-consumed reactants and inert low boiling hydrocarbons are removed preferably by flashing. The remaining gas stream comprising polymer is fed into the reactor system 1 as shown in FIG. 1. The reactor system 1 comprises a fluidized bed unit 2 and a moving bed unit 3.

Monomer is entering the fluidized bed unit via line 4 and optionally via line 5 inert gas, comonomer and/or hydrogen are added. Via a lower space 6 and a gas distribution plate 7, the reaction gas enters the fluidized bed unit 2.

Polymer originating from the previous polymerization is added via line 10 to a unit 9 from where it is transported via line 8 into the fluidized bed unit 2. Other catalyst components may be added to the unit 9 via a line 11.

The moving bed unit 3 resides coaxially in the cylindrical fluidized bed unit 2. Sidewise around the moving bed unit 3 is generated and maintained a fluidized bed of catalytic particles on which particle due to the polymerization reaction further polymer is formed. The composition of the polymer formed is dependant on the residing conditions, such as the concentration of monomer, comonomer, inert gas and hydrogen. The fluidized bed circulation is visualised by the arrows 12. At the top of the fluidized bed reactor polymer particles are separated from gas in a disengaging section 13. The gas leaves the fluidized bed unit via a recirculation line 14. Gas present in line 14 may be optionally cooled in a heat exchanger 15. Subsequently the gas is compressed in a compressor 16 and after cooling in a heat exchanger 17 re-introduced to the fluidized bed unit via the inlet 18.

A part of the polymer particles in the fluidized bed unit (visualised by arrows 19) enters the inlet 20 of moving bed unit 3 and forms a bed of settled polymer particles which move slowly downwards in a more or less plug stream towards an outlet 21.

On top of the downwards moving bed of polymer particles a cushion of separation of fluidum is formed which is added via the lines 24 and nozzles 25 into the moving bed, preferably at about 0.1 to 0.7 of the height of the bed above the base.

In the outlet 21 of the moving bed unit 3 the displacement means 22 is arranged in the form of a screw 23. The screw extends through the outlet 21 up and into the interior of the moving bed unit 3. At one end the screw is rotated via the rotational screw shaft 26. Due to the rotation polymer particles in a metered quantity are displaced from the moving bed unit 3 and released into the fluidized bed unit 2. Dependent on the rotational speed the outflow of particles from the moving bed unit 3 is carefully controlled. At the same time the residence time and height of the polymer bed in the moving bed unit is controlled.

The rotational screw shaft 26 is connected to a gear box 27 which is part of stirrer means 28 which are rotationally disposed within the fluidized bed unit 2 using supporting and driving means not illustrated.

Constantly or intermittently polymer is removed via an outlet 29 provided with a valve 30. In a separator 31 polymer particles are separated and removed via an outlet 32. Gaseous material is recycled via a line 33 into the line 14.

Figure 2:
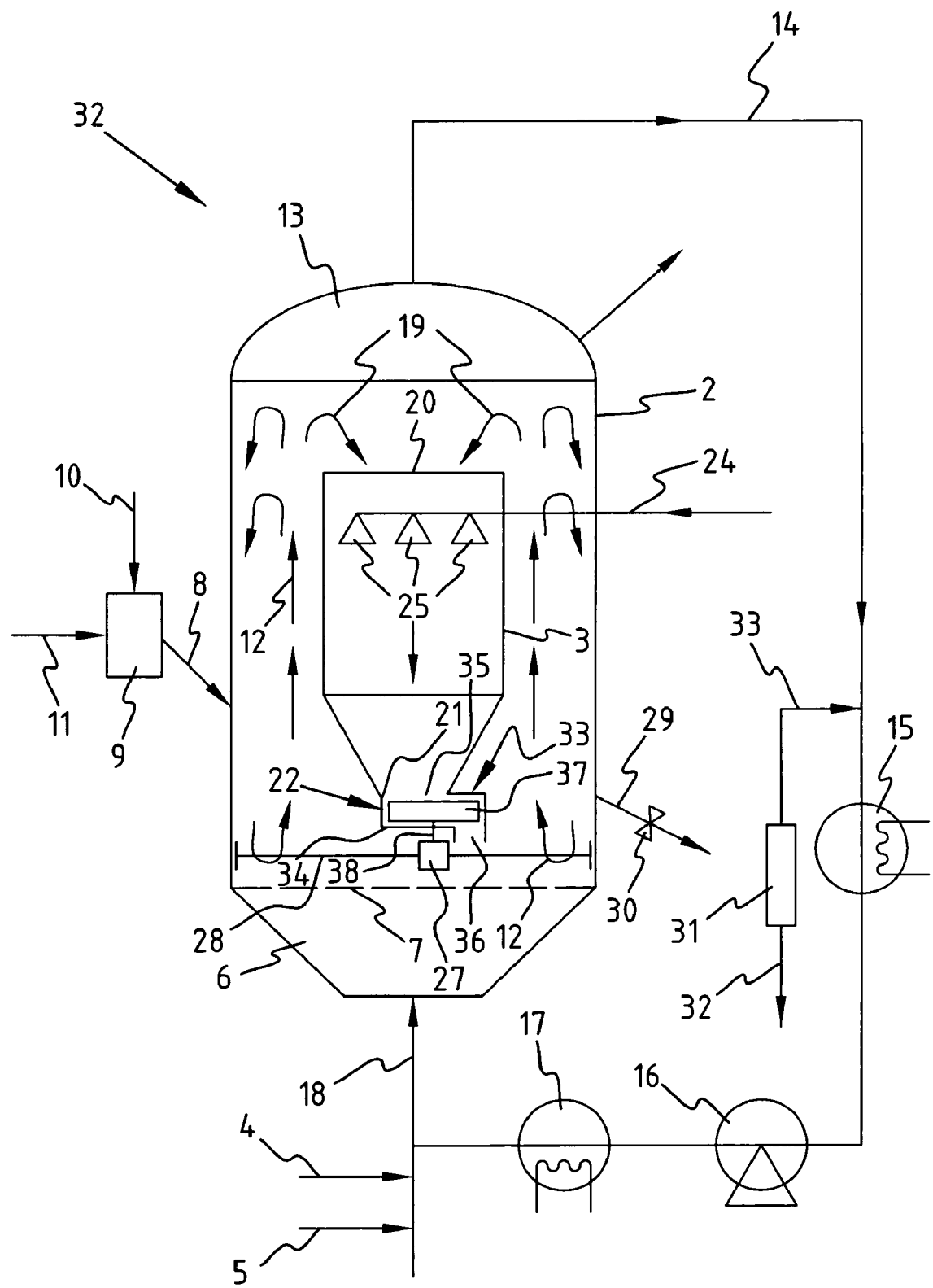
FIG. 2 shows a similar reactor system in which the displacement means have the form of a scooper.

FIG. 2 shows a reactor system 32 comprising a fluidized bed unit 2 and a moving bed unit 3 arranged in an orientation similar as shown in FIG. 1.

In this embodiment the displacement means 22 comprise a scooper 33 arranged in the outlet 21 of the moving bed reactor 3. The scooper 33 is arranged in a housing 34 defining a scooper inlet 35 and a scooper outlet 36. The scoops 37 are arranged on a rotational shaft 38 connected to a gear box 27 arranged on stirrer means 28 as described in relation to the reactor system 1 as shown in FIG. 1.

In between two scoops 37 and the confinement of the housing 34 is defined a space filled with polymer particles which is displaced by rotation from the inlet 35 to the outlet 36 where this space is emptied and the polymer particles originally present therein released into the fluidized bed unit 2. The volume in-between two scoops and the housing confinement on the one hand, and the rotational speed of the shaft 38 determines the rate at which metered quantities of polymer particles are removed from the moving bed unit 3 and released in the fluidized bed 2.

Figure 3:
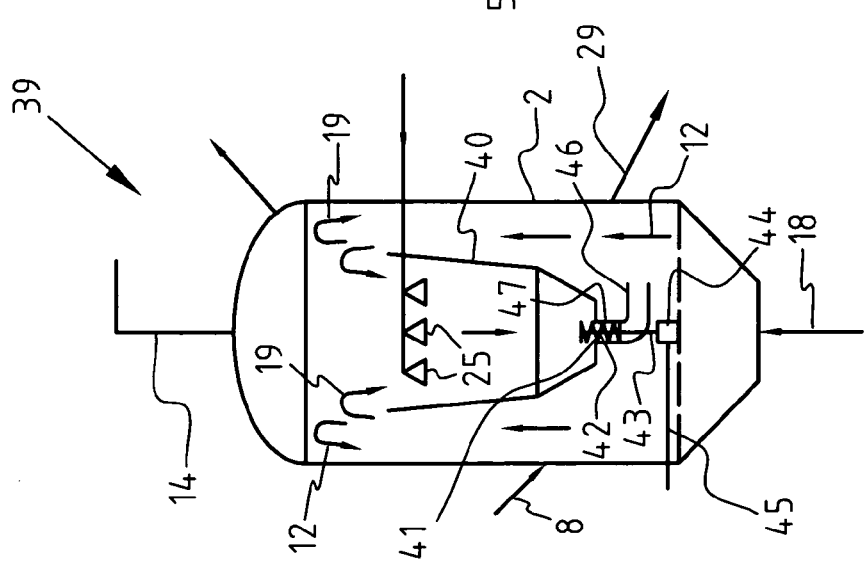
FIG. 3 shows a reactor system in which the displacement means comprise a screw which is horizontally oriented.

FIG. 3 shows another embodiment of the reactor system 39 according to the present invention. For sake of convenience only several reference numbers corresponding to reference numbers in FIGS. 1 and 2 are shown.

The moving bed unit 40 has a downwardly converging bottom. The outlet 41 of the moving bed unit 40 is provided with displacement means 22 according to the invention which have the form of a screw 42 of which the screw shaft 43 is connected to a gear box 44 which is activated via a shaft 45. The screw 42 is substantially vertically oriented having its outlet 46 at an angle of about 90° relative to the flow of fluidized material visualised by arrows 12. Accordingly there is an optimal release of polymer particles in a metered manner via the displacement means in the form of a vertical screw 42 from the moving bed unit 40 into the fluidized bed unit 2 via a horizontal outlet 46. The screw 42 within its housing 47 defines a compression zone towards the outlet 46 wherein the polymer particles are mutually compressed during their transfer towards the outlet 46. They form a seal against the inflow of fluidization gas via the outlet 46 into the moving bed unit 40.

Figure 4:
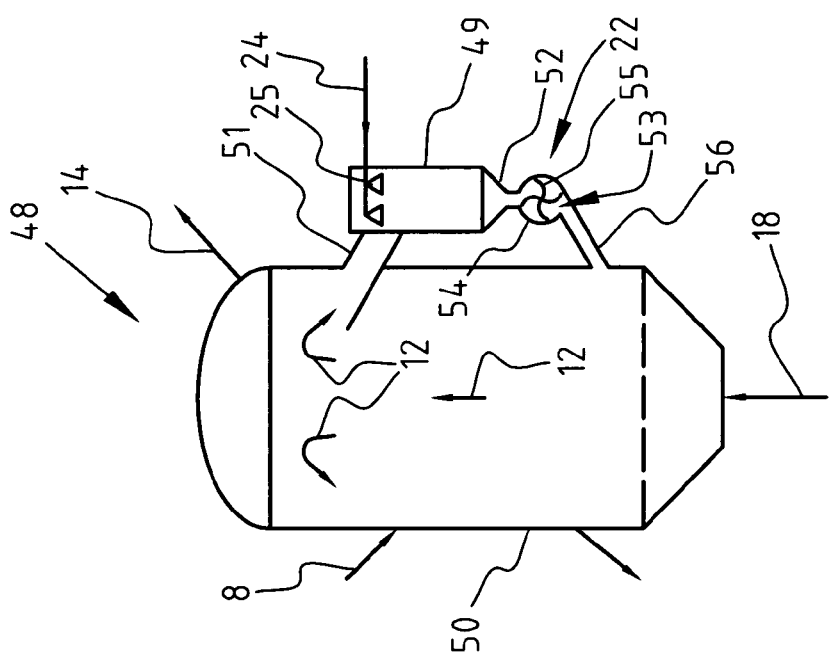
FIG. 4 shows a reactor system in which the moving bed unit is residing adjacent to the moving bed reactor and provided with a scooper as displacement means.

FIG. 4 shows a reactor system 48 according to the present invention, wherein the moving bed unit 49 is situated outside and adjacent to a fluidized bed unit 50. Via a conduit 51 particulate material from the interior of the fluidized bed unit 50 enters the moving bed unit 49. The moving bed unit 49 is provided with an outlet 52 connected to displacement means 22 according to the invention having the form of a scooper 53 arranged in a scooper housing 54. The scooper 53 comprises scoops 55 arranged on a common scooper shaft which is horizontally oriented and driven by a non-illustrated motor. The volume defined by two adjacent scoops and the confinement of the housing 54 forms the metered amount of particulate material which is removed from the moving bed reactor 49 and via the conduit 56 re-circulated to the interior of the fluidized bed unit 50.

Figure 5:
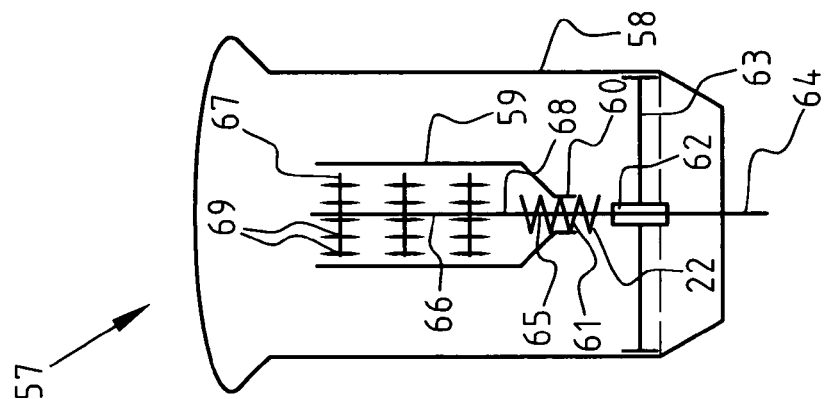
FIG. 5 shows a reactor system in which the displacement means comprise a screw which on the one hand is connected to a stirrer in the fluidized bed unit and on the other hand to a stirrer residing in the moving bed unit.

FIG. 5 shows another reactor system 57 according to the invention. Arranged within the fluidized bed unit 58 is the co-axially oriented moving bed reactor 59 of which the outlet 60 is provided with displacement means 22 in the form of a screw 61 connected to a gear box 62 arranged on a stirrer 63 based within the fluidized bed unit 58.

The screw shaft 65 is connected to a stirrer 66 extending vertically in the moving bed reactor 59 and having stirrer arms 67 extending horizontally at three levels within the moving bed unit 59. Via a line 64 and via the screw shaft 65 and stirrer shaft 68 is provided to nozzles 69 arranged in the stirrer arms 67 a feed of gas. Such gas feed improves the feed and distribution of gas within the moving bed unit at various levels and within each level over the total width of the moving bed unit 59.

Figure 6:
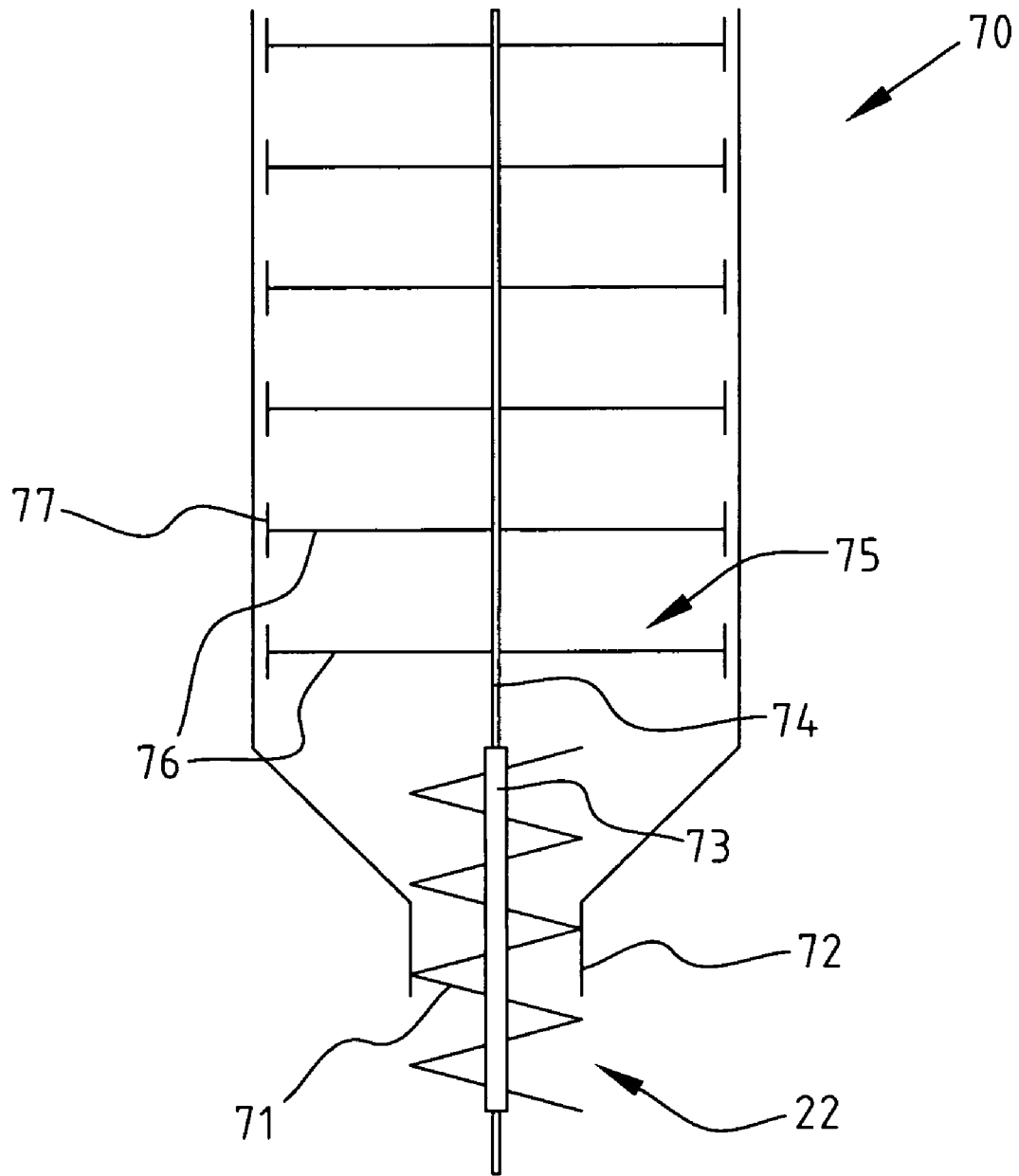
FIG. 6 shows a reactor system in which the displacement screw means are connected to a stirrer with optimal stirring properties particularly adjacent the inner wall of the moving bed unit.

Finally, FIG. 6 shows a detail of a reactor system 70 comprising displacement means 22 having the form of a screw 71 arranged in an outlet 72 of the moving bed unit 70. The screw shaft 73 is connected to the rotational shaft 74 of a stirrer 75 residing within the moving bed 70. The stirrer 75 has stirrer arms 76 provided with stirring elements 77 (and optionally with gas feed nozzles as discussed for the reactor system 57 shown in FIG. 5). The moving bed unit 70 is arranged outside and adjacent to the fluidized bed unit (not shown). The outlet 72 is connected (preferably in an upwardly inclined orientation) to an inlet of the fluidized bed unit. The shafts 73 and 74 are rotated by a motor (not shown). Again an optimal distribution of polymer particles and optimal avoidance of particle plugging is assured by the use of the displacement means 22 according to the invention in that in a controlled manner polymer particles are removed in metered quantities (depending on the rotational speed of the screw 71) out of the moving bed and into the fluidized bed. Accordingly optimal freedom of operation is provided for obtaining polymer particles having the desired properties.

EXAMPLE 1

The fluidized bed reactor was used as described in FIG. 3. The screw was horizontal orientated and has an 80 mm compression zone at the outlet of the moving bed unit. The horizontal screw comprised four screw elements having a thickness of 7 mm, a diameter of 154 mm and a flight length of 82 mm.

A bed of polyethylene powder having an average diameter (as determined by sieving) of 300 μm was used with air as fluidization gas. The flow rate of air was 135 kg/h and the temperature was 25° C. The bed level was 146 cm. The flow rate of the powder within the moving bed unit was set by adjusting the screw speed, which was done by adjusting the frequency of the 1 kW motor of the screw.

The frequency of the screw motor was set to 20 Hz. Metered amounts of polymer particles were displaced out of the moving bed unit. This caused a powder flow within the moving bed to be 2.3 $dm^3/s$ and consequently the powder residence time in the moving bed unit was 37 s

EXAMPLE 2

The procedure of Example 1 was repeated except that frequency was set to 15 Hz. The powder flow within the moving bed was then 1.7 $dm^3/s$ and the powder residence time 52 s.

EXAMPLE 3

The procedure of Example 1 was repeated except that frequency was set to 10 Hz and the air flow to 103 kg/h. The powder flow within the moving bed was then 1.1 $dm^3/s$ and the powder residence time 80 s.

EXAMPLE 4

The procedure of Example 3 was repeated except that frequency was set to 5 Hz. The powder flow within the moving bed was then 0.56 $dm^3/s$ and the powder residence time 155 s.

COMPARATIVE EXAMPLE 1

The procedure of Example 1 was repeated except that the moving bed unit discharged the polymer directly into the fluidized bed via a mechanical valve without a screw being present. The polymer did not flow out of the moving bed unit.

The invention claimed is:
1. A reactor system for the catalytic polymerization of olefin monomer and optionally comonomer(s), comprising:
   one or more inlets for olefin monomer, catalyst, optionally for comonomer, chain growth controllers or chain transfer agents, and/or inert gas,
   an outlet for gas and
   an outlet for polymerized particles,
wherein the reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are connected to the fluidized bed unit, wherein gas feed means for feeding gas at one or more different levels in the moving bed unit are present within the moving bed unit, and wherein the outlet of the moving bed unit is provided with means for displacing metered quantities of polymer particles from the moving bed unit into the fluidized bed unit.

2. A reactor system for the catalytic polymerization of olefin monomer and optionally comonomer(s), comprising:

one or more inlets for olefin monomer, catalyst, optionally for comonomer, chain growth controllers or chain transfer agents, and/or inert gas, an outlet for gas and an outlet for polymerized particles, wherein the reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are connected to the fluidized bed unit, wherein the outlet of the moving bed unit is provided with means for displacing metered quantities of polymer particles from the moving bed unit into the fluidized bed unit, wherein the displacing means comprise piston means connected to the outlet of the moving bed unit.

3. The reactor system according to claim 2, wherein the outlet of the displacement means is oriented in an inclined or horizontal direction.

4. The reactor system according to claim 1, wherein a rotational shaft of the displacement means is oriented in a substantially vertical position.

5. The reactor system according to claim 1, wherein the displacement means are connected to stirrer means present in the moving bed unit.

6. The reactor system according to claim 5, wherein the gas feed means for feeding gas into the moving bed unit are part of stirrer means present in the moving bed unit.

7. The reactor system according to claim 1, wherein the gas feed means is incorporated into the displacement means.

8. The reactor system according to claim 1, wherein the moving bed unit resides within, around or adjacent to the fluidized bed unit.

9. A process for the catalytic polymerization of olefins, comprising the step of polymerizing olefins with a particulate catalyst, and optionally comonomer, chain growth controllers or chain transfer agents, and/or inert gas, wherein at least part of the polymerization reaction is carried out in a reactor system comprising at least one fluidized bed unit and at least one a moving bed unit, wherein the fluidized bed unit comprises means for maintaining a fluidized bed in the fluidized bed unit and wherein the moving bed unit is provided with an inlet and an outlet which are connected to the fluidized bed unit, wherein gas is fed into the moving bed via gas feed means for feeding gas at one or more different levels in the moving bed unit, and wherein the outlet of the moving bed unit is provided with means for displacing metered quantities of polymerized particles from the moving bed unit into the fluidized bed unit.

10. The process according to claim 9, wherein gas is fed into the moving bed unit via stirrer means provided with the gas feed means.

11. The process according to claim 9, wherein the gas feed means is incorporated into the displacement means.

12. The process according to claim 9, wherein separation fluidum is supplied to the moving bed via the displacement means and stirrer means, and the separation fluidum is a gas or a liquid and selected from the group consisting of an inert gas or liquid, nitrogen, $C_1$-$C_{12}$-alkane or olefins, $C_2$-$C_{12}$-alkene, and mixtures thereof, and the separation fluidum is a liquid evaporating under the residing polymerization conditions.

13. The process according to claim 9, wherein liquid olefins are added as separation fluidum such that the polymerization in the moving bed unit is a condensed mode polymerization.

14. The process according to claim 9, wherein liquid olefins are added to the fluidized bed such that the polymerization in the fluidized bed is in a condensed mode polymerization.

15. The process according to claim 12, wherein the separation fluidum comprises a polymerization monomer or comonomer, or mixture thereof.

16. A method for the catalytic polymerization of olefins comprising polymerizing olefins with a catalyst wherein at least part of the polymerization reaction is carried out in a reactor system according to claim 1.

17. The reactor system according to claim 6, wherein the gas feed means are present at different levels in the moving bed unit.

18. The process according to claim 9, wherein the gas feed means are present at one or more different levels in the moving bed unit between 0.1 and 0.7 of the height of the moving bed above a base of the moving bed.

19. The reactor system of claim 1, wherein the gas feed means are present at one or more different levels in the moving bed unit between 0.1 and 0.7 of the height of the moving bed above a base of the moving bed.

* * * * *